United States Patent
Hartenstine et al.

(10) Patent No.: US 7,232,185 B2
(45) Date of Patent: Jun. 19, 2007

(54) ADJUSTABLE HEAD REST FOR CHILD CAR SEAT

(75) Inventors: Curtis M. Hartenstine, Birdsboro, PA (US); Sharon A. Gillett, Shillington, PA (US)

(73) Assignee: Wonderland Nursery goods Co., Ltd., Taipei (TW)

( * ) Notice: Subject to any disclaimer, the term of this patent is extended or adjusted under 35 U.S.C. 154(b) by 0 days.

(21) Appl. No.: 11/519,466

(22) Filed: Sep. 12, 2006

(65) Prior Publication Data

US 2007/0057545 A1 Mar. 15, 2007

Related U.S. Application Data

(60) Provisional application No. 60/760,235, filed on Jan. 19, 2006, provisional application No. 60/717,331, filed on Sep. 15, 2005.

(51) Int. Cl.
- *A47D 1/10* (2006.01)
- *B60N 2/28* (2006.01)
- *A47C 7/38* (2006.01)

(52) U.S. Cl. ............... 297/250.1; 297/256.1; 297/256.11; 297/353; 297/410

(58) Field of Classification Search ............ 297/250.1, 297/256.1, 256.11, 410, 353
See application file for complete search history.

(56) References Cited

U.S. PATENT DOCUMENTS

| | | | | |
|---|---|---|---|---|
| 4,754,999 A | | 7/1988 | Kain | 297/250 |
| 4,854,639 A | * | 8/1989 | Burleigh et al. | 297/250.1 |
| 5,806,933 A | | 9/1998 | Tsui | 297/391 |
| 6,030,047 A | * | 2/2000 | Kain | 297/250.1 X |
| 6,045,184 A | * | 4/2000 | Nakagawa | 297/250.1 |
| 6,068,337 A | | 5/2000 | De Filippo | 297/391 |
| 6,220,668 B1 | | 4/2001 | Scheffzfick | 297/391 |
| 6,273,509 B1 | * | 8/2001 | Reithmeier et al. | 297/410 |
| 6,305,749 B1 | | 10/2001 | O'Connor | 297/397 |
| 6,378,950 B1 | * | 4/2002 | Takamizu et al. | 297/250.1 X |
| 6,428,099 B1 | * | 8/2002 | Kain | 297/256.1 |
| 6,464,294 B1 | | 10/2002 | Kain | 297/250.1 |
| 6,481,794 B1 | | 11/2002 | Kassai | 297/250.1 |
| 6,485,101 B2 | * | 11/2002 | Kassai et al. | 297/250.1 |
| 6,491,348 B1 | * | 12/2002 | Kain | 297/250.1 X |
| 6,623,074 B2 | * | 9/2003 | Asbach et al. | 297/250.1 |

(Continued)

FOREIGN PATENT DOCUMENTS

EP   1136313   9/2001

*Primary Examiner*—Rodney B. White
(74) *Attorney, Agent, or Firm*—Miller Law Group, PLLC

(57) ABSTRACT

A head rest for a car seat used to transport a child in an automobile is positionally adjustable vertically along the seat back on which the head rest is mounted. A latching mechanism, actuated by a button at the top of the head rest, is located within the frame of the head rest and includes a releasable latch engageable with the channels slidably supporting the support rails of the head rest. A retainer clip is mounted at the top of the channels to prevent the head rest from being separated from the seat back once assembled thereon. The head rest includes a pair of laterally spaced wings that are pivotally connected to the rear support portion of the head rest to be positionally adjustable relative to the child's head through an angular displacement of approximately 45 degrees. The pivot mechanism is operable to lock the wings in the selected position.

21 Claims, 12 Drawing Sheets

U.S. PATENT DOCUMENTS

| | | | |
|---|---|---|---|
| 6,648,416 B2 | 11/2003 | O'Connor | 297/397 |
| 6,682,143 B2 | 1/2004 | Amirault | 297/250.1 |
| 6,705,675 B1* | 3/2004 | Eastman et al. | 297/250.1 |
| 6,811,216 B2* | 11/2004 | Sedlack | 297/250.1 |
| 6,834,915 B2* | 12/2004 | Sedlack | 297/256.13 |
| 6,857,700 B2* | 2/2005 | Eastman et al. | 297/250.1 |
| 6,908,151 B2* | 6/2005 | Meeker et al. | 297/250.1 |
| 7,021,710 B2* | 4/2006 | Kain et al. | 297/256.11 |
| 7,055,903 B2 | 6/2006 | Balensiefer | 297/256.11 |
| 2001/0011838 A1* | 8/2001 | Kassai et al. | 297/250.1 |
| 2002/0195867 A1* | 12/2002 | Barger et al. | 297/484 |
| 2003/0151282 A1* | 8/2003 | Williams et al. | 297/250.1 |
| 2004/0124676 A1* | 7/2004 | Kain | 297/250.1 |
| 2004/0124678 A1* | 7/2004 | Williams et al. | 297/256.11 |
| 2004/0189068 A1* | 9/2004 | Meeker et al. | 297/250.1 |
| 2005/0082888 A1* | 4/2005 | Williams et al. | 297/250.1 |
| 2005/0189806 A1* | 9/2005 | Hall et al. | 297/256.11 |
| 2005/0200177 A1* | 9/2005 | Balensiefer | 297/250.1 |
| 2005/0225136 A1 | 10/2005 | Horton | 296/250.1 |

* cited by examiner

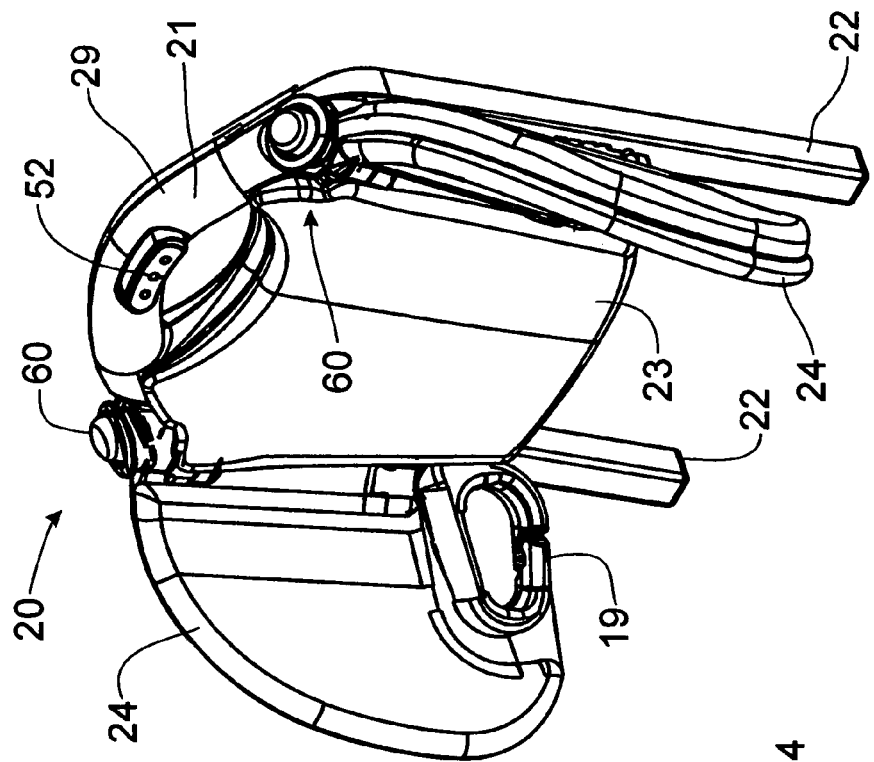
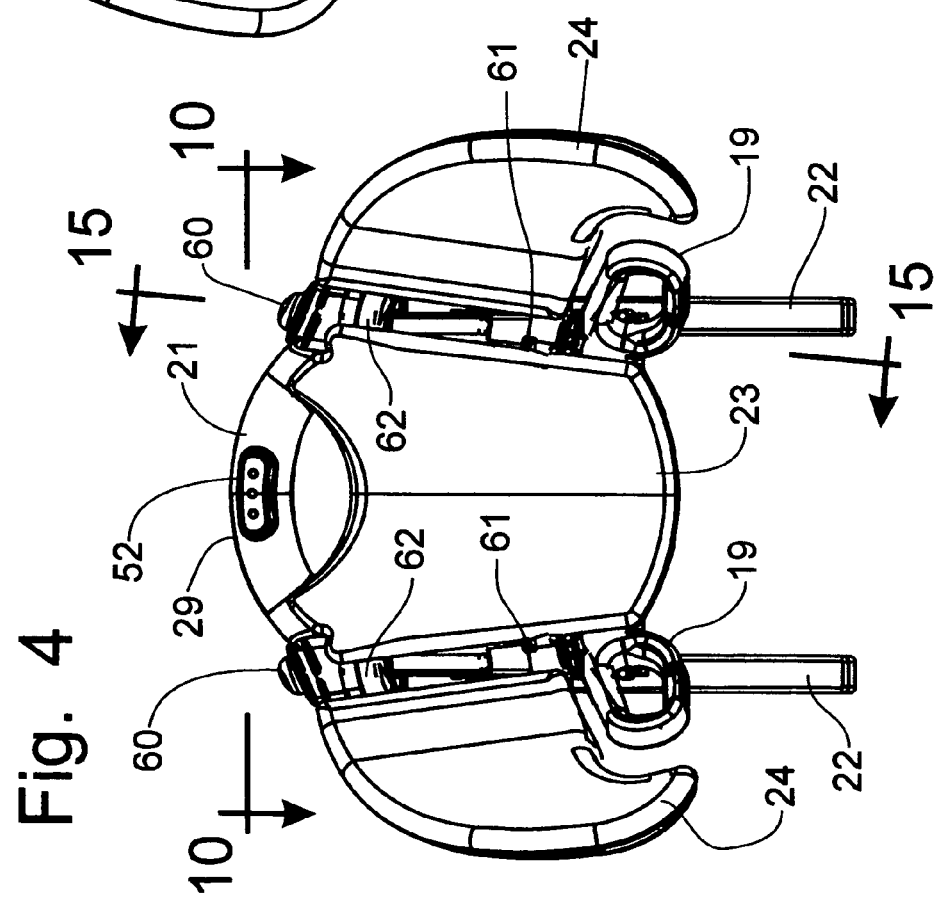

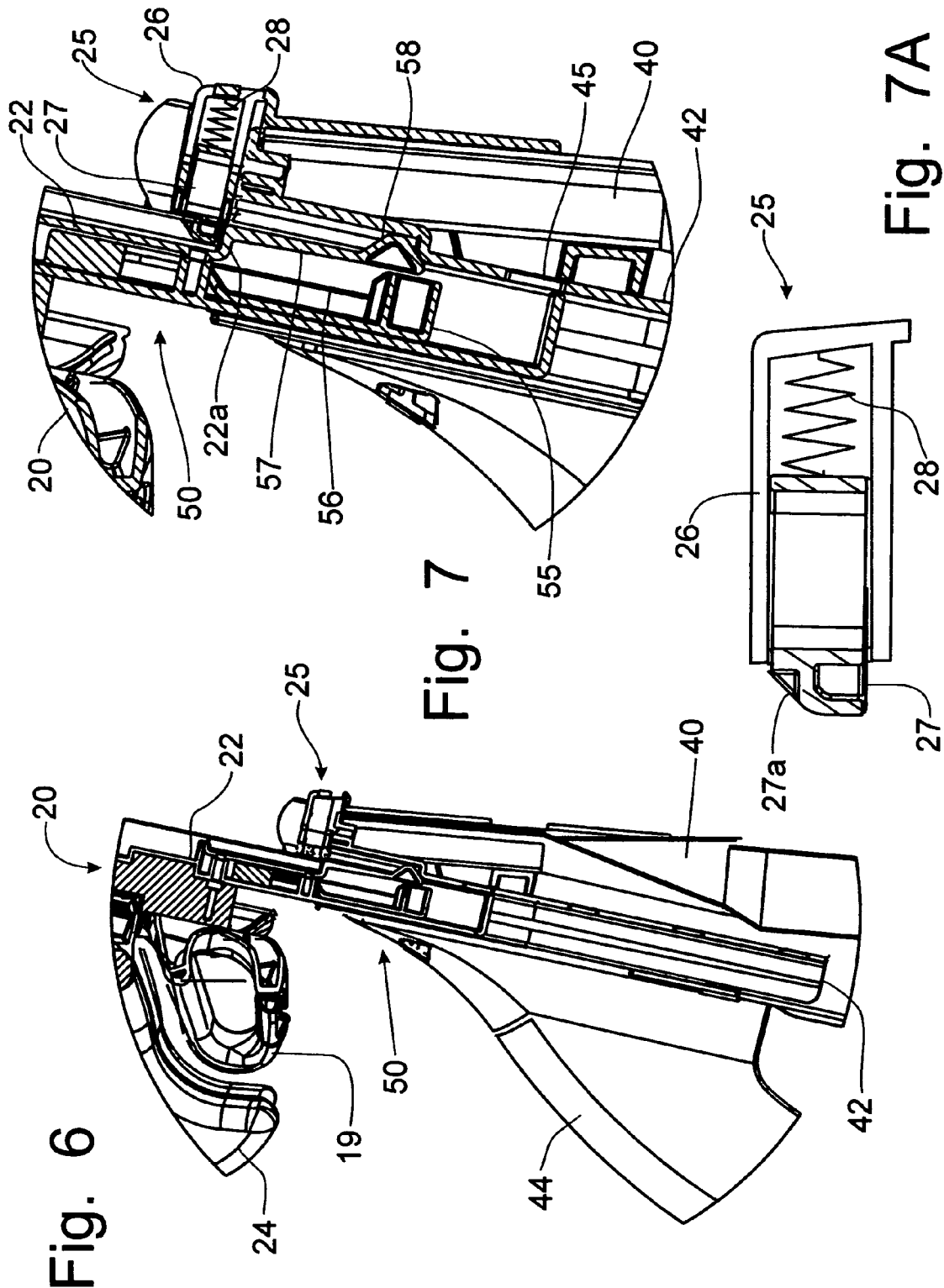

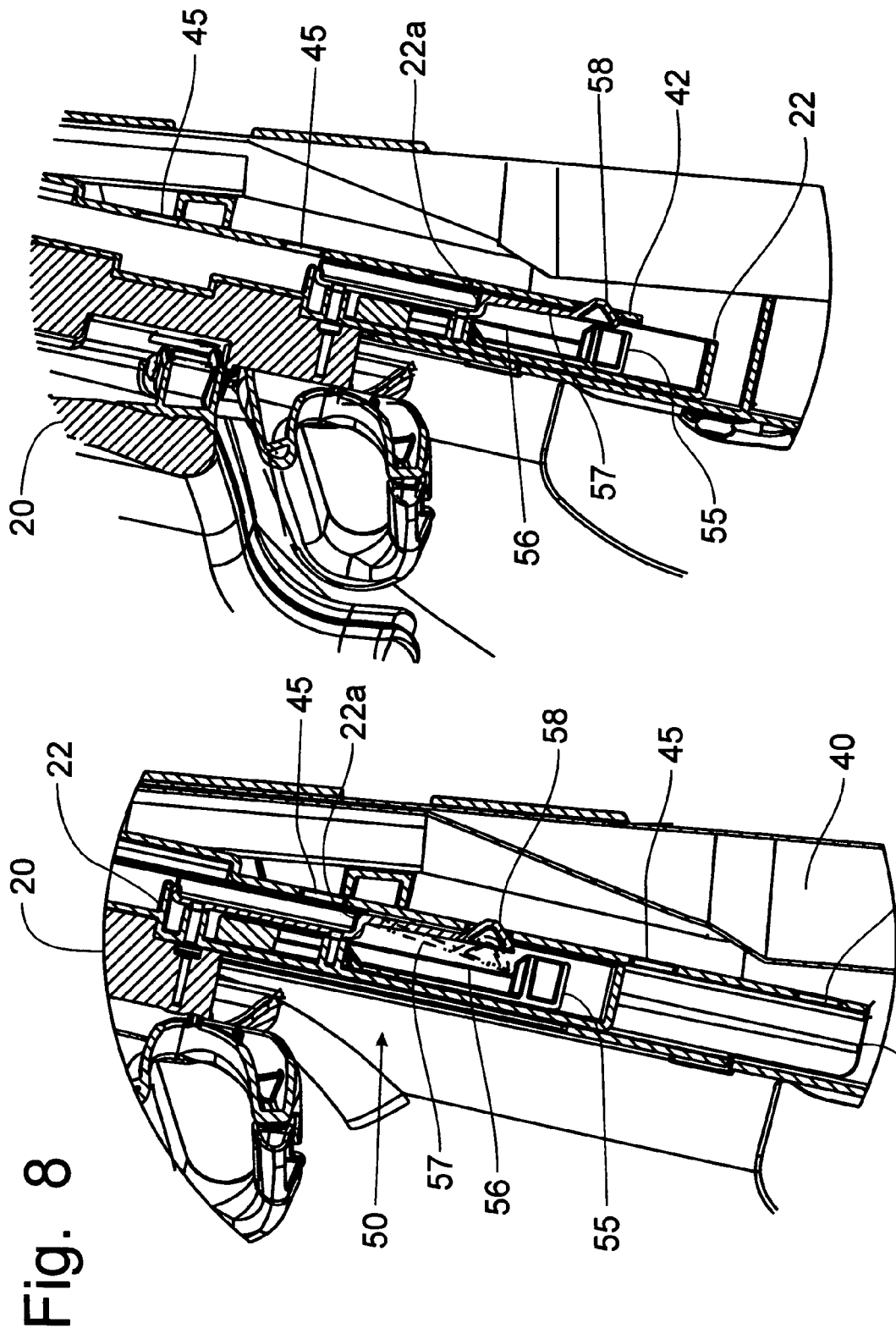

Fig. 12
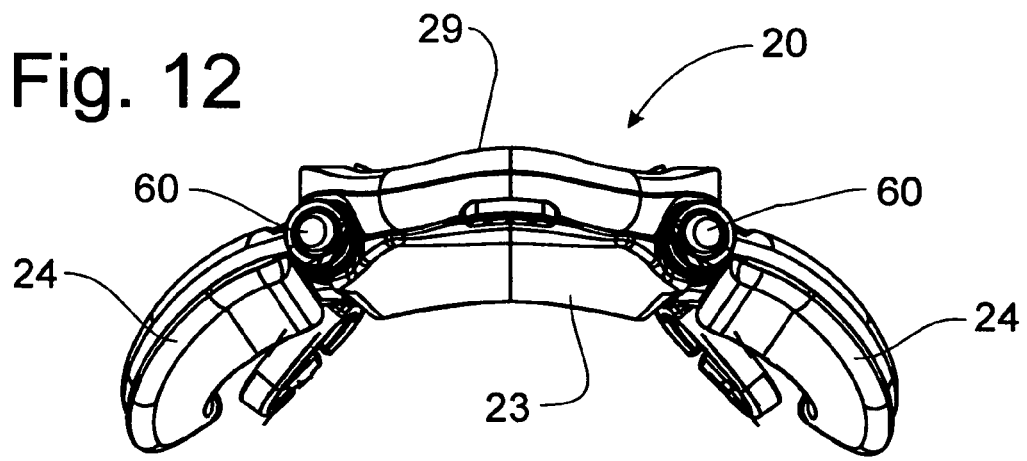
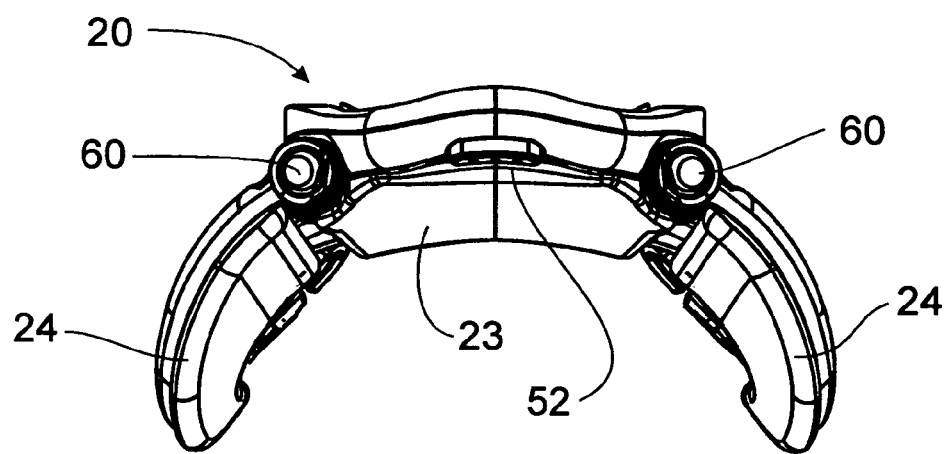
Fig. 13
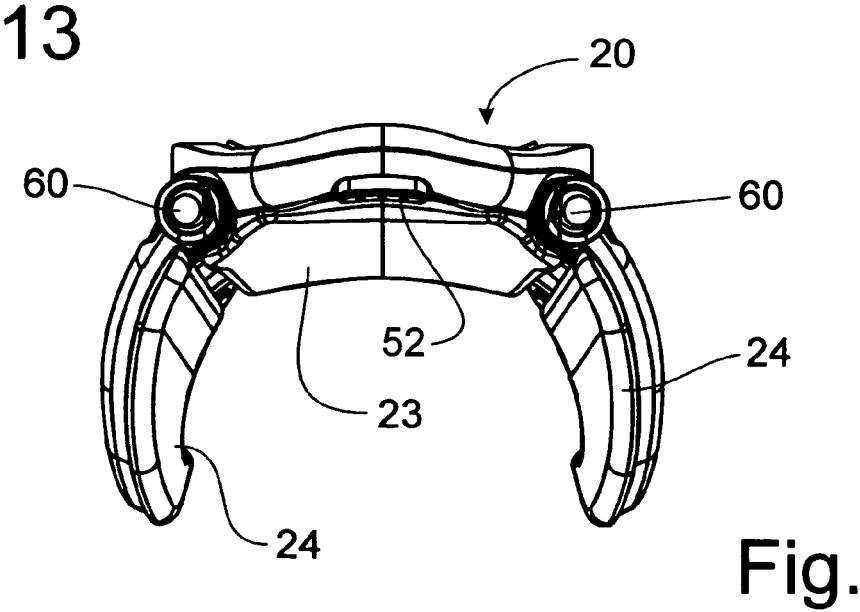
Fig. 14

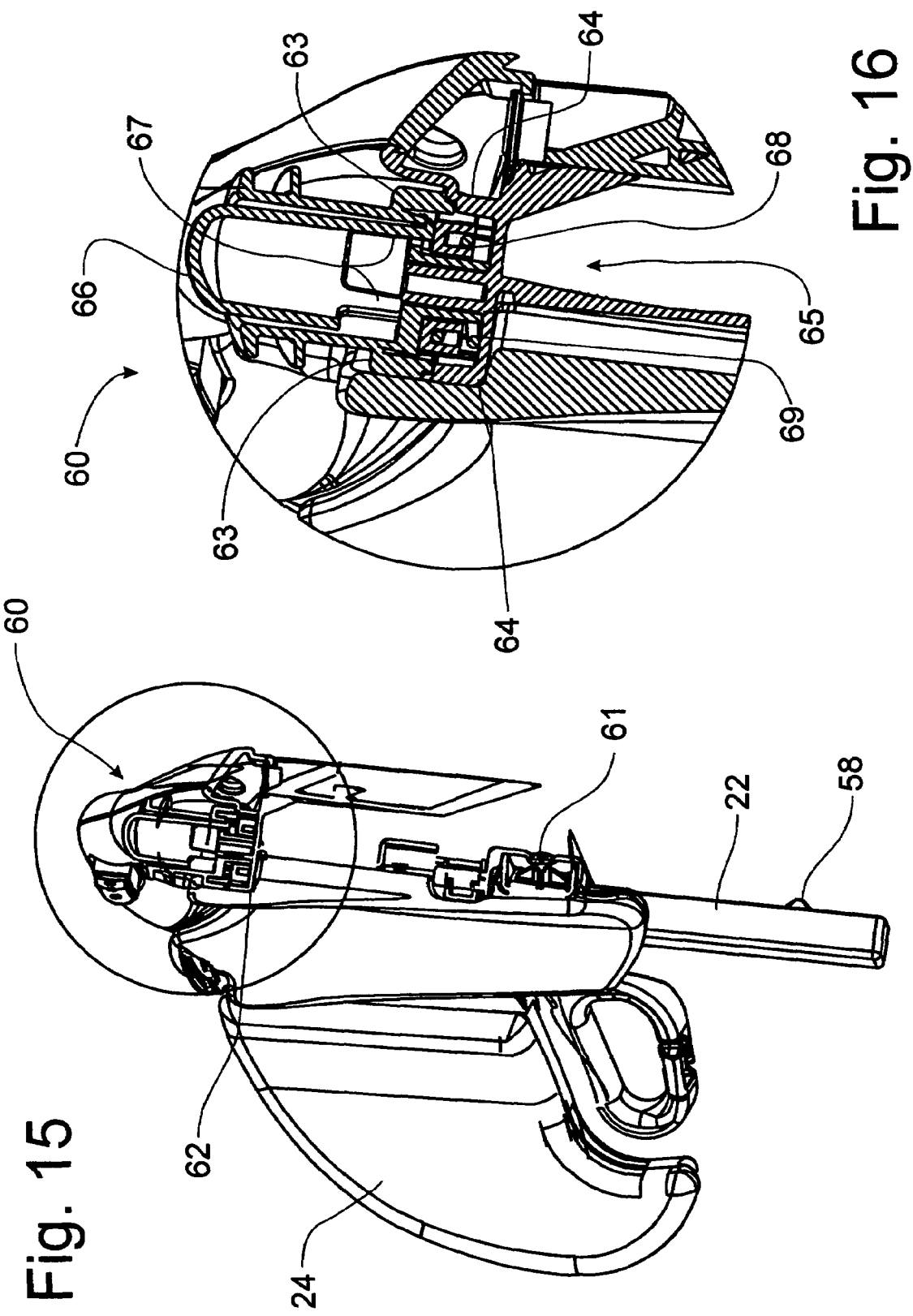

ADJUSTABLE HEAD REST FOR CHILD CAR SEAT

CROSS-REFERENCE TO RELATED APPLICATIONS

This application claims priority on U.S. Provisional Patent Application Ser. No. 60/717,331, filed on Sep. 15, 2005, and on U.S. Provisional Patent Application Ser. No. 60/760,235, filed on Jan. 19, 2006, the contents of both provisional patent applications being incorporated herein by reference.

FIELD OF THE INVENTION

The present invention relates generally to a car seat for use in transporting children in an automobile, and, more particularly, to a head rest for the car seat that can be adjusted in position to support the child's head comfortably and safely.

BACKGROUND OF THE INVENTION

Car safety seats for children are commercially available in a many configurations corresponding to differences in the age, weight, and size of the child being transported. Parents can choose a car seat that is not only the correct size, but also suits their tastes, budget, and life style. As children grow in size and maturity level, they need different kinds of car seats. For example, a child may initially use a rearwardly facing infant car seat, then graduate to a forward facing toddler seat with an integrated harness, and finally to a belt positioning booster seat utilizing the vehicle's lap and shoulder belt system before being able to safely use the vehicle's seat belts alone.

There are many car seats on the market that can be used in multiple configurations. For instance, a forward facing car seat with an integral harness appropriate for a 20-40 pound child might accommodate a child weighing 30-100 pounds as a belt positioning booster seat with the removal of the harness and utilizing the vehicle's lap and shoulder belts. This is convenient for the care giver because it means fewer seats to purchase. Some parents choose to buy a belt positioning booster seat for their older child. Such a booster seat may be configured with a high back, such as is disclosed in U.S. Pat. No. 6,682,143, granted to Davis Amirault on Jan. 27, 2004, or can have no back at all. Older children who don't want to be seen sitting in a "baby seat" like this option and parents don't have to manage a big bulky car seat.

Currently available car seats typically have a monolithic shell, i.e. the back and seat cannot be used separately. Some car seats are designed to have a no back base option, but are configured as a separate seat fastened under the monolithic seat and back, such as is disclosed in U.S. Pat. No. 4,754,999, issued on Jul. 5, 1998, to James Kain. The problem with this configuration is the redundancy of seats; one as part of the monolithic shell, and one as a seat only.

States review and regulate restraint age limits and weight requirements. With continuing age and weight increases for recommendations in car restraint safety, a variety of restraint sizes are needed to accommodate the increasing span of children needing car seat safety restraints. The shoulder height and proper placement of belt paths are critical to the safety function of car seat restraints. As the child grows the headrest area needs to accommodate their body size and move up as they grow. Some seats are used for more than one child and the head rest area needs to move up and down to fit properly with each child. Purchasing new seats as the child grows is a costly alternative. Some seats on the market have up and down head rest adjustment but they are not always obvious or easy to operate. One example of a car seat having an adjustable head rest can be found in U.S. Pat. No. 6,623,074, granted to Ronald Asbach on Sep. 23, 2003, wherein the head rest is vertically movable on the seat back with the harness straps passing through the head rest to be adjustable therewith. Another example can be found in U.S. Patent Application Publication No. 2005/0225136, filed by William Horton and published on Oct. 13, 2005, in which the head rest is vertically adjustable relative to the seat back.

Children frequently fall asleep while in a car seat. The result is their head falls forward and is not adequately supported. The side supports on some child safety seats are either angled out too far to rest the head or positioned correctly but are rigid and immovable, such as is shown in the aforementioned U.S. Pat. No. 6,623,074 and U.S. Patent Application Publication No. 2005/0225136. The side supports need to move in and out to accommodate differing head sizes. The side supports need to be able to move in order to rest the head while sleeping then move back out to give the child comfort and visibility while traveling. Side supports alone are not a solution to prevent the head from falling forward as the child falls asleep. The child may rest his head sideways, but the movement in the vehicle will cause the child's head to fall forward and bob uncomfortably.

U.S. Pat. No. 6,481,794, issued to Kenzou Kassai on Nov. 19, 2002, discloses a car seat having a sleeping support position controller with bearings provided on the headrest and shafts provided on the sleeping supports. Concave portions provided on the lower surfaces of the shafts engage with convex portions provided on the lower surfaces of the bearings and the coil springs inserted from above maintain this engaging state with an elastic force, thereby fixing the positions of the sleeping supports. U.S. Pat. No. 7,055,903, granted to Eugene Balensiefer on Jun. 6, 2006, discloses an adjuster for a car seat that includes a dial actuator coupled to the back support for rotational movement relative to the back support, the dial actuator actuating a lock-release mechanism of the height-adjustment mechanism and freeing the headrest for up-and-down movement relative to the seat shell. U.S. Pat. No. 6,464,294 granted on Oct. 15, 2002, to James Kain teaches a car seat having a seat back with a forwardly facing surface adapted to face toward the occupant of the seat and including a recess in the forwardly facing surface. A headrest retainer is located in the head rest recess and is configured to retain the head rest in a selected one of the lowered and raised positions relative to the seat back at the option of a user.

Head rests for automobiles are also vertically adjustable and can be provided with positionable wing members, such as in U.S. Pat. No. 6,068,337, granted to Emillio De Fillippo on May 30, 2000, for an automotive head rest that includes a framework and a pair support rods slidably coupled within the framework. Positioning notches cooperate with a pair of arms carried by a slider member movable in the framework of the headrest, in a direction perpendicular to the support rods, between an engaged position and a disengaged position. The head rest found in U.S. Pat. No. 5,806,933 issued on Sep. 15, 1998, to Leslie Tsui utilizes an elongated arm and a mounting member having an internally toothed portion adapted to engage with a radially toothed exterior portion in the arm. A position adjusting assembly for an automotive head rest having a coupling mechanism, an operating member and a connecting cable is disclosed in European Patent Publication EP 1136313 wherein the cable exerts a force on the coupling mechanism to project a locking pin into notches in the support member.

Adjustable wings for automotive hear rests are disclosed in U.S. Pat. No. 6,220,668, granted to Matthias Scheffziick on Apr. 24, 2001, in which an activation button is used to release the head rest side wings from the locked position. The pivotal connection of the side wings to the central head rest is formed of a journal having a groove and a bolt arranged within the groove. U.S. Pat. No. 6,305,749, granted on Oct. 23, 2001, and U.S. Pat. No. 6,648,416, granted on Nov. 18, 2003, both being issued to Richard O'Connor, disclose an automotive head rest in which side wings are mounted by a friction hinge having sufficient friction to maintain any of a plurality of positions under the load of a human head leaning against the wing member, but capable of yielding when a greater load is applied.

It would be desirable to provide a head rest for a car seat to be utilized in transporting a child in an automobile in which the head rest would be vertically adjustable to accommodate growth in the child and in which the side wings would be positionally adjustable through a substantial range of angular positions to enhance the comfort of the child utilizing the car seat.

SUMMARY OF THE INVENTION

It is an object of this invention to provide a car seat for transporting children in an automobile that is a positionally adjustable head rest.

It is another object of this invention to provide a head rest for a child's car seat that is vertically movable and is formed with side wings that are angularly positionable.

It is a feature of this invention that the side wings are mounted to the central rear support portion of the head rest through a pivot mechanism that establishes the pivoted position of the side wings.

It is another feature of this invention that the pivot mechanism for the side wings has a locking device to retain the side wings in the selected pivoted position.

It is an advantage of this invention that the side wings can be selectively positioned to enhance the comfort of the child being transported on the car seat.

It is another advantage of this invention that the vertically positionable head rest will adjust positionally to the size of the child being transported on the car seat.

It is still another advantage of this invention that the vertically movable head rest will accommodate the growth of the child without requiring a new car seat to be purchased.

It is still another feature of this invention that a pillow apparatus can be utilized with the side wings to help support the head of the child, particularly when the child is sleeping.

It is yet another feature of this invention that the pillow apparatus can be positioned in multiple positions along the side wings.

It is yet another advantage of this invention that the side wings can be selectively positioned to rest the child's head while sleeping, then move back out to give the child comfort and visibility while traveling.

It is a further feature of this invention that the vertical adjustment of the head rest can be effected by a single hand.

It is still another feature of this invention that the latching mechanism is contained within the frame of the head rest assembly.

It is yet another feature of this invention that the head rest is restrained from being separated from the seat back, once assembled thereon, by a retainer clip mounted at the top of the channels in the seat back.

It is a further advantage of this invention that the head rest cannot be removed from the seat back once installed thereon.

It is a further feature of this invention that the latching mechanism used to cause movement of the head rest vertically relative to the seat back on which it is mounted, and the latching mechanism used to control the pivoted movement of the side wings, are intuitively operable.

It is yet another advantage of this invention that the vertical positioning of the head rest will coordinate with the utilization of the routing openings in the seat back so that the head rest will uncover the routing openings to be used thus positioning the safety harness with respect to the shoulders of the child using the car seat.

It is yet another object of this invention to provide a head rest for a car seat which is durable in construction, inexpensive of manufacture, carefree of maintenance, facile in assemblage, and simple and effective in use.

These and other objects, features and advantages are accomplished according to the instant invention by providing a head rest for a car seat used to transport a child in an automobile that is positionally adjustable vertically along the seat back on which the head rest is mounted. A latching mechanism, actuated by a button at the top of the head rest, is located within the frame of the head rest and includes a releasable latch engagable with the channels slidably supporting the support rails of the head rest. A retainer clip is mounted at the top of the channels to prevent the head rest from being separated from the seat back once assembled thereon. The head rest includes a pair of laterally spaced wings that are pivotally connected to the rear support portion of the head rest to be positionally adjustable relative to the child's head through an angular displacement of approximately 45 degrees. The pivot mechanism is operable to lock the wings in the selected position.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is a front elevational view of the head rest separated from the seat back;

FIG. 5 is a perspective view of the head rest depicted in FIG. 4;

FIG. 6 is an enlarged partial cross-sectional view of the car seat showing the mounting of the head rest on the seat back and the latching mechanism housed within the frame of the head rest assembly to secured the position of the head rest on the seat back, the head rest being vertically located in the highest position, as depicted in FIG. 1;

FIG. 7 is an enlarged partial cross-sectional view of the latching mechanism depicted in FIG. 6;

FIG. 7A is an enlarged detail view of the retainer catch forming part of the retainer clip depicted in FIG. 7, a representative spring being schematically shown;

FIG. 8 is an enlarged partial cross-sectional view of the latching mechanism in the head rest similar to that of FIG. 7, but depicting the head rest positioned lower on the seat back;

FIG. 9 is an enlarged partial cross-sectional view of the latching mechanism similar to that of FIG. 8, but showing the head rest in the lowest possible position as depicted in FIG. 3;

FIG. 12 is a top plan view of the head rest with the side wings position at an angle of approximately 25 degrees relative to the plane of the rear support portion;

FIG. 13 is a top plan view of the head rest with the side wings angled at a position of approximately 45 degrees relative to the plane of the rear support portion;

FIG. 14 is a top plan view of the head rest with the side wings positioned with an angular deflection of approximately 65 degrees with respect to the plane of the rear support portion;

FIG. 15 is a cross-sectional view of the head rest taken through the hinge mechanism supporting the side wings to the rear portion of the head rest, corresponding to lines 15-15 of FIG. 4;

FIG. 16 is an enlarged partial cross-sectional view of the upper part of the hinge mechanism depicted in FIG. 15 to show the locking apparatus;

DETAILED DESCRIPTION OF THE PREFERRED EMBODIMENT

Figure 1:
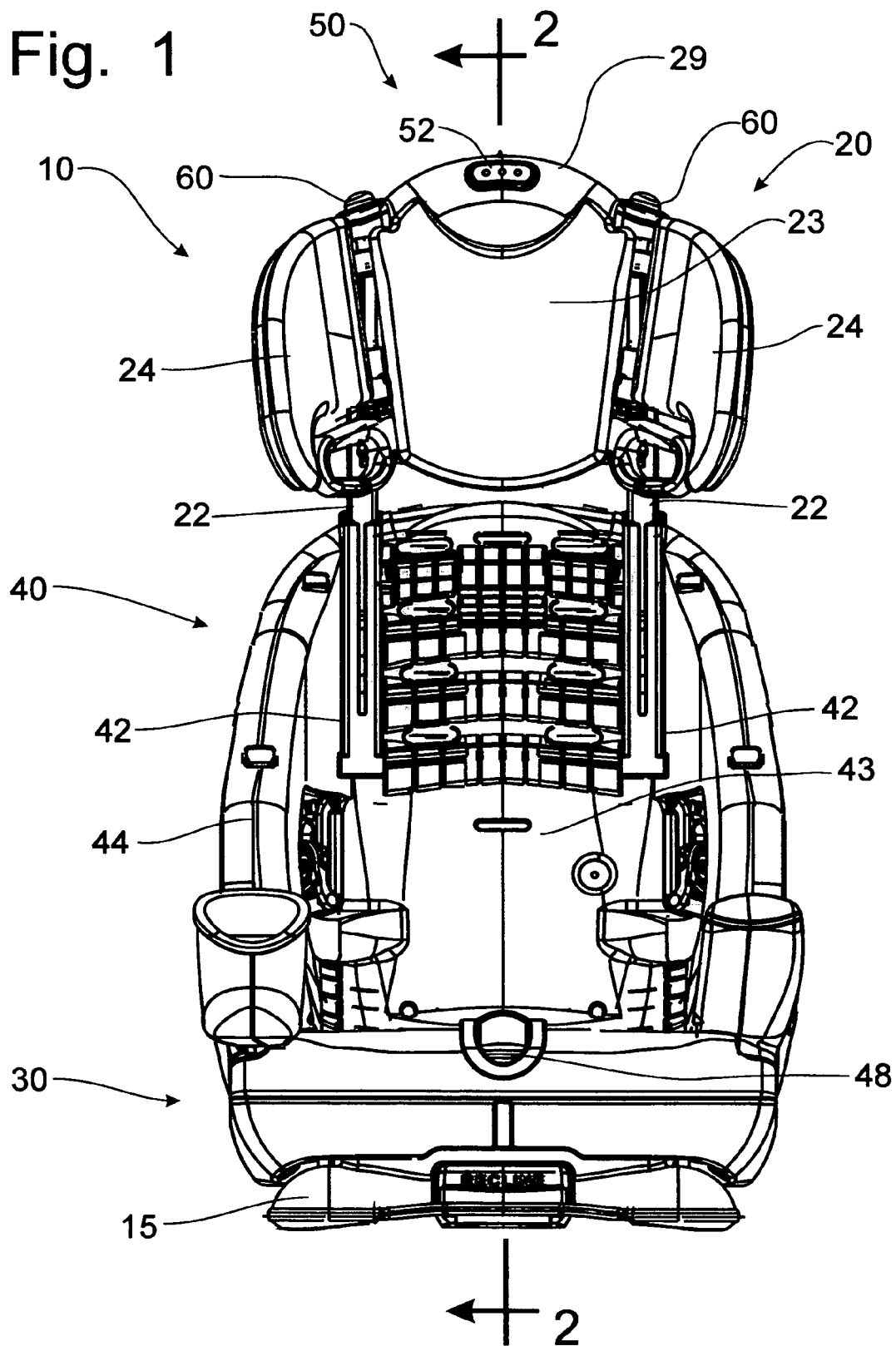
FIG. 1 is a front elevational view of a car seat incorporating the principles of the instant invention, the harness and conventional fabric liner being deleted for purposes of clarity, the head rest being positioned in a vertically extended orientation corresponding to a large toddler positioned in the car seat.
Figure 2:
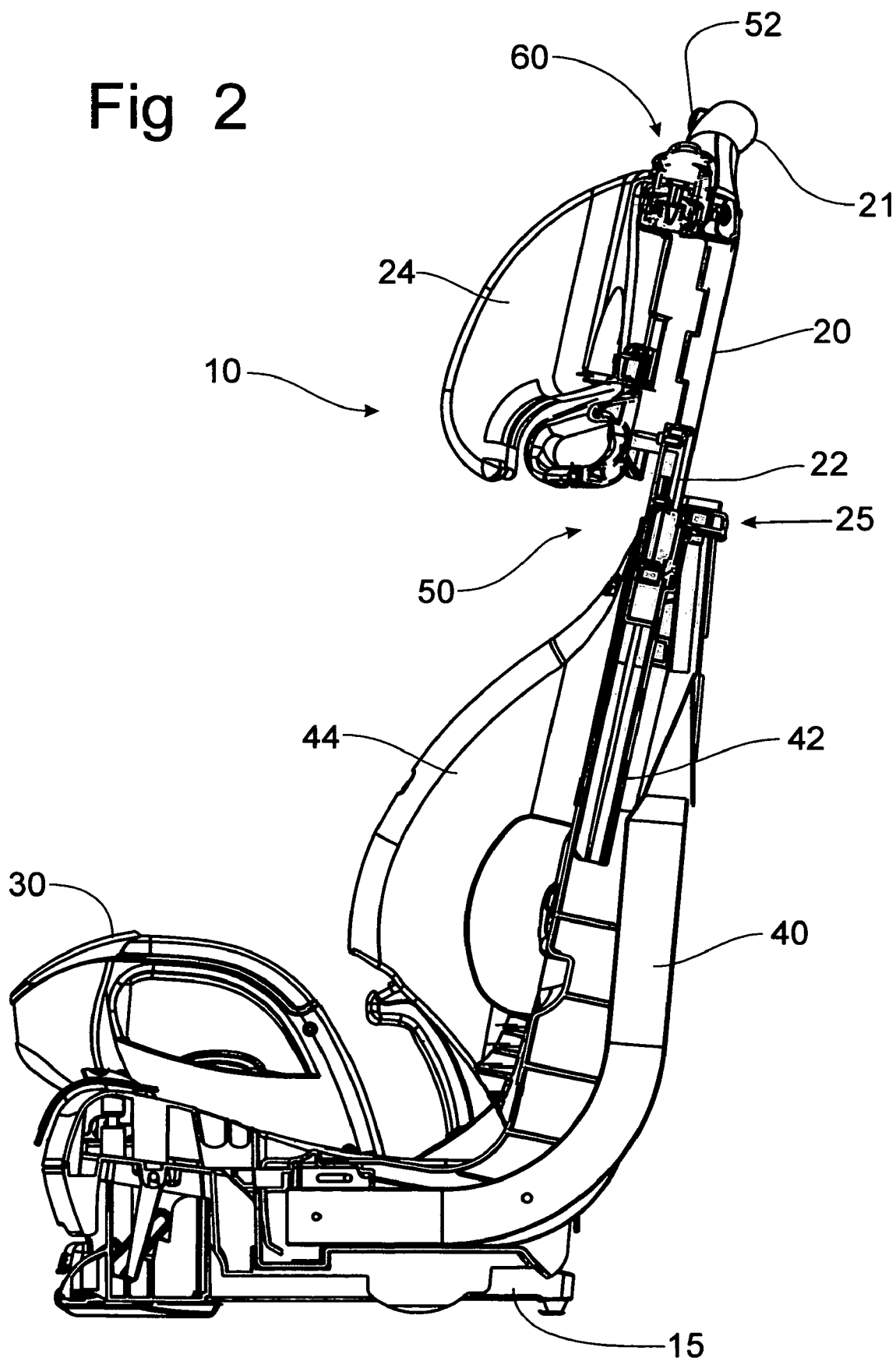
FIG. 2 is a cross-sectional view taken through the center of the car seat along lines 2-2 of FIG. 1.
Figure 3:
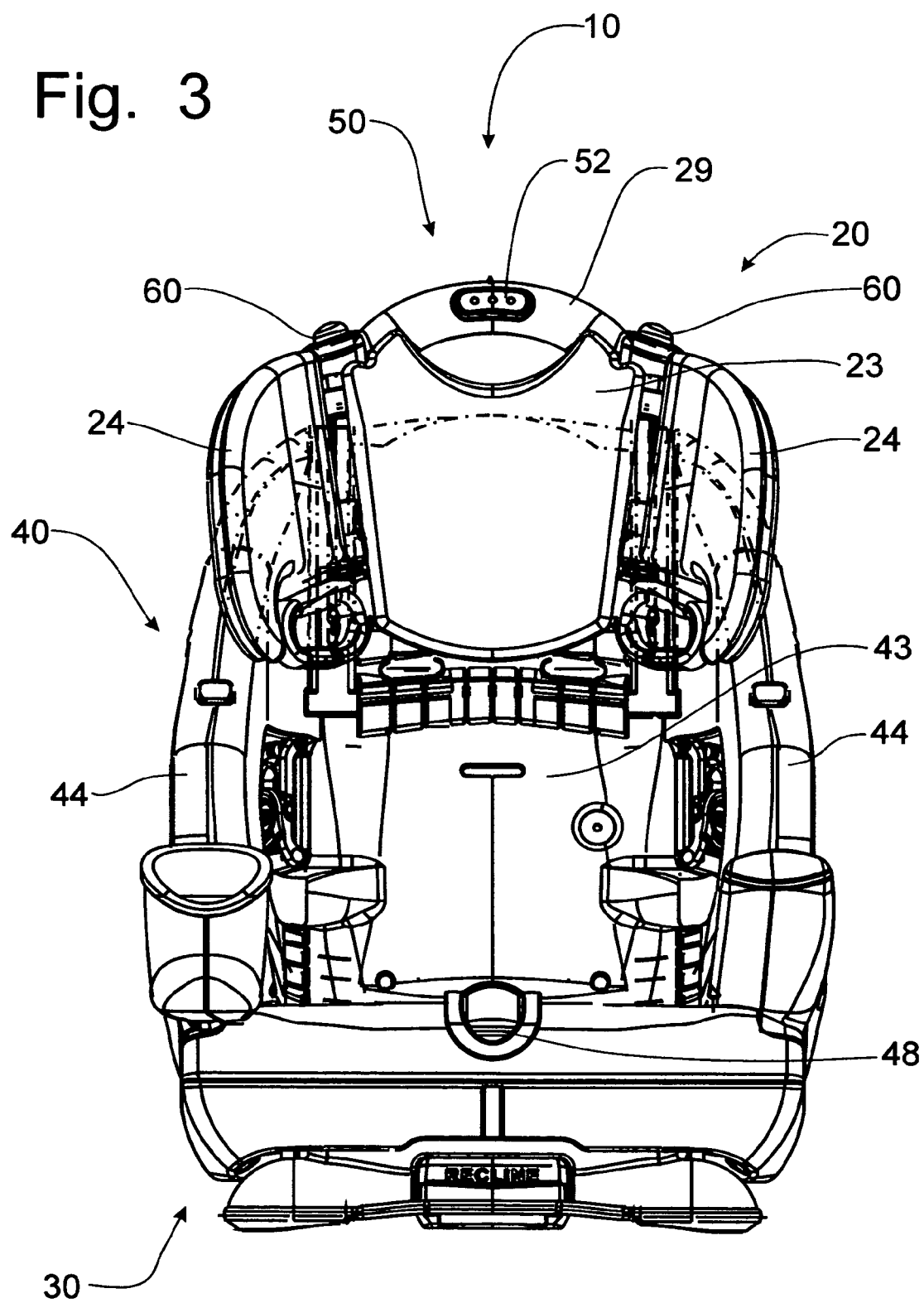
FIG. 3 is a front elevational view of the car seat depicted in FIG. 1, but with the head rest lowered to a position corresponding to a small toddler positioned in the car seat.

Referring now to FIGS. 1-3, a car seat incorporating the principles of the instant invention can best be seen. The car seat 10 can be configured into a generally conventional L-shaped configuration providing a seat assembly 30 on which the child is supported while being transported in an automobile with an upright seat back 40 supporting the back of the child and a head rest 20 vertically movable on the seat back to support the head of the child positioned in the car seat 10.

The car seat 10 is intended for use with a child larger than an infant, which is typically placed into a rearwardly facing infant car seat until the child is large enough and old enough to be positioned in a forwardly facing car seat 10, which is typically about the first birthday of the child. The car seat 10, however, can be configured in multiple orientations to correspond to the growth of the child until the child is old enough and large enough to safely sit on the car seat using the seat belts of the automobile without benefit of any booster apparatus.

Typically, toddlers and young children are placed into the conventional L-shaped configuration of the car seat 10, such as is depicted in FIG. 3, with the head rest 20 lowered onto the upper portion of the seat back 40 to provide proper support for the child's head. The car seat 10 can be re-configured through a movement of the head rest 20 through multiple positions to allow the car seat 10 to be adapted to the growth of the child. FIG. 1 depicts the maximum height of the head rest 20 for use with larger children before moving onto a booster seat.

As can be seen in FIGS. 1-7, the head rest 20 includes a pair of support rails 22 that are received within channels 42 formed at the top of the seat back 40. A latching mechanism 50 is located within the head rest 20 to secure the position of the head rest 20 on the seat back 40. Preferably, the head rest 20 is formed with a back support portion 23 and a pair of wings 24 projecting forwardly of the back support portion 23 and at an angle corresponding to the orientation of the side wings 44 of the seat back 40 so that the head rest 20 will nest properly along the upper portion of the seat back 40, as is depicted in FIG. 3, when the head rest 40 is in a lowered position. Preferably, the wings 24 are pivotally positionable to aid in the comfort of the child being transported on the car seat 10, as will be described in greater detail below. Accordingly, the wings 24 are connected to the back portion 23 by a pivot mechanism 60 that permits the selective positioning of the wings 24.

The seat back 40 has a rear support portion 43 from which the side wings 44 extend in a fixed monolithic structure. The upper part of the rear support portion 43 includes a harness routing apparatus 45 including a plurality of pairs of routing openings 46 spaced vertically between the channels 42. The harness routing apparatus 45 allows the passage of the harness (not shown) through the seat back 40 to establish a proper fit on the child's shoulders positioned in the car seat 10. The harness will pass through a selected pair of routing openings 46 to traverse from the front of the seat back 40 to the rear of the seat back 40, establishing a support point on the seat back 40 for the harness being routed through the seat back 40. The harness straps then extend upwardly from the selected routing openings 46 on the rearward side of the seat back 40 to a hanger (not shown) positioned at the top of the rear support portion 43. The harness straps then turn over top of the hanger and extend downwardly to the bottom of the rear support portion 43 where the harness straps extend forwardly to the conventional harness tightening apparatus 48 at the front part of the seat assembly 30.

Figure 11:
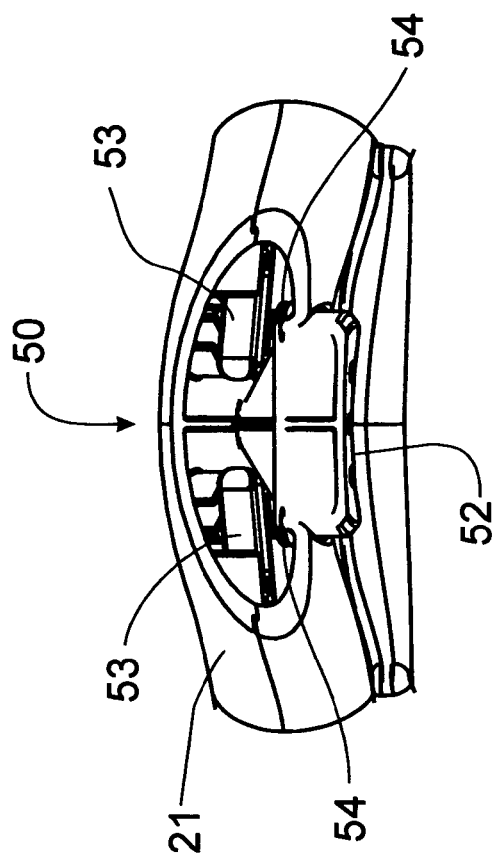
FIG. 11 is an enlarged partial cross-sectional view of the latching mechanism shown in FIG. 10.
Figure 10:
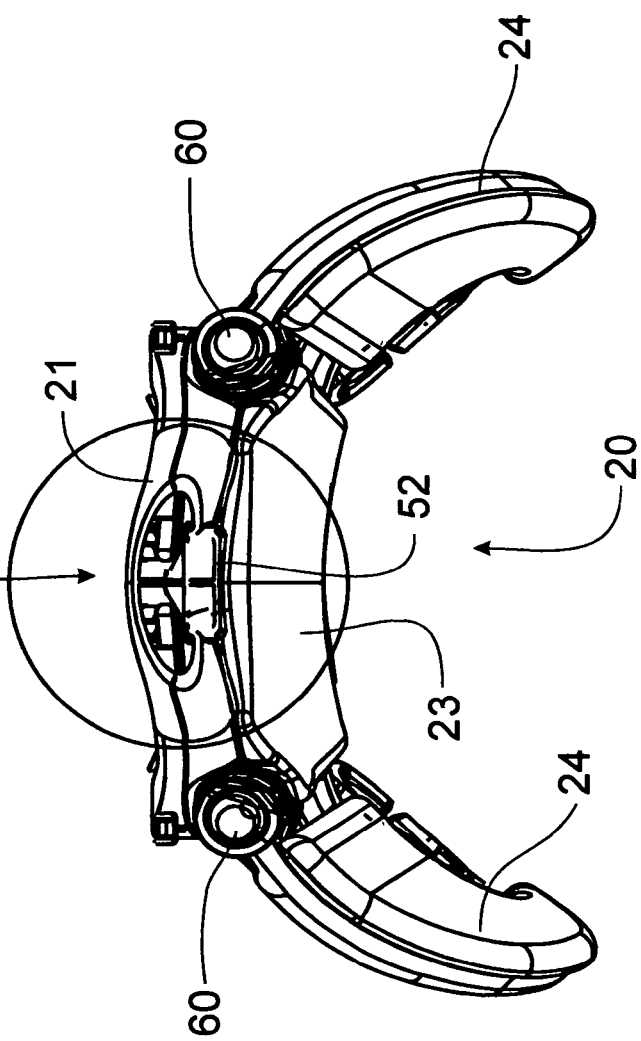
FIG. 10 is a cross-sectional view of the head rest and latching mechanism actuator corresponding to lines 10-10 on FIG. 4; removing only a top central portion of the housing for the head rest.
Figure 11A:
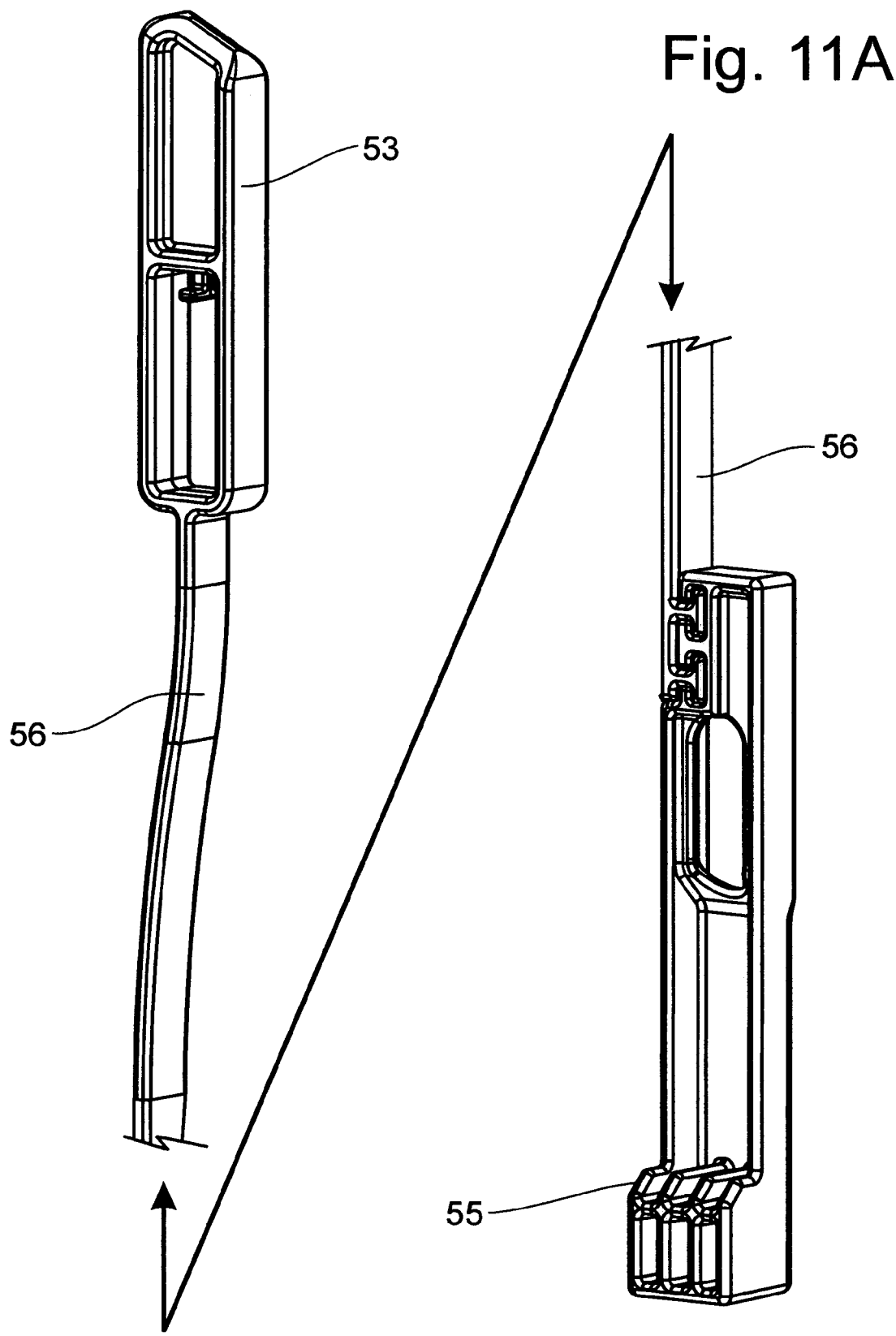
FIG. 11A is an enlarged detail view of a part of the latching mechanism housed inside the frame of the head rest from the top handle to the end of the support tubes.
Figure 16A:
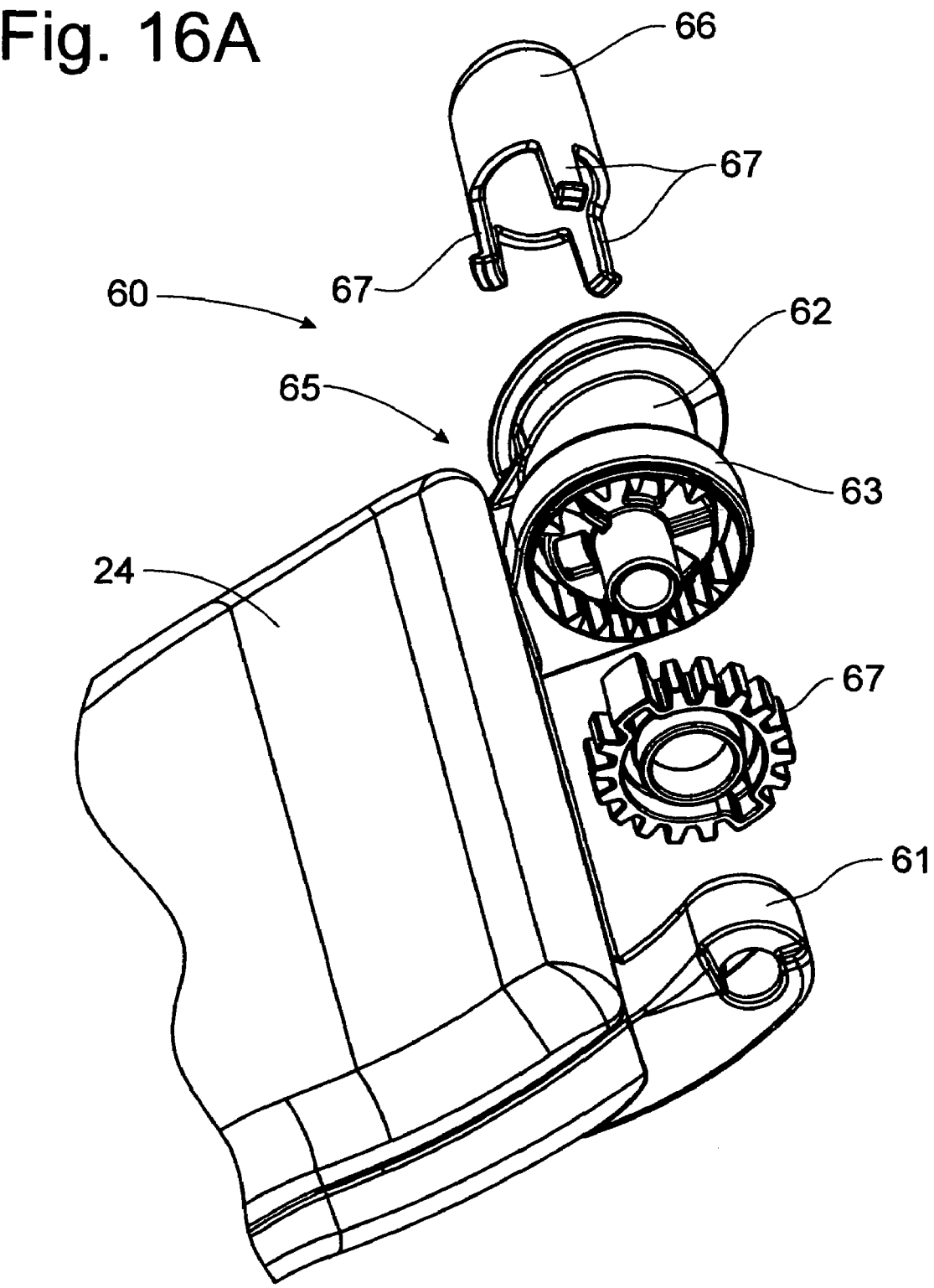
FIG. 16A is an enlarged partial exploded view of a side wing to show the details of the pivot locking mechanism for the side wing.

Referring now to FIGS. 6-11A, the latching mechanism 50 securing the selected vertical position of the head rest 20 relative to the seat back 40 can best been seen. The latching mechanism 50 includes an actuation button 52 mounted in the upper part of the housing 21 for the head rest 20, which forms a handle 29 with which the head rest can be grasped. The actuation button 52, as best seen in FIGS. 10 and 11, depresses into the housing 21 to cause movement of opposing cam members 53 supported within the housing 21 proximate to the actuation button 52. The cam members 53 are connected to respective flexible links 56, best seen in FIG. 11A, which, in turn, connect to drivers 55 located near the bottom of the hollow support rails 22. The actuation button 52 is biased for movement toward a home position outwardly against the housing 21 by engagement with the cam members 53, which are spring-loaded so as to return to their home position when retracted with the actuation button 52.

When the actuation button 52 and the cam members 53 are in the home position, the respective drivers 55 are positioned adjacent to corresponding latch members 57 having an outwardly projecting latch keeper 58 that are formed in a cantilevered manner of resilient material so that the movement of the driver 55 away from the latch member 57, the latch keeper 58 springs back inside the hollow support rail 22, as is depicted in phantom in FIG. 8. The drivers 55 are forced to drop below the latch members 57 by the flexible members 56 when the actuation button 52 is depressed and the cam members 53 are moved in concert therewith. The spring forces associated with the cam members 53 drive the drive blocks 55 upwardly into engagement with the latch members 57, a camming edge on the drive blocks helping to start movement of the latch members 57 to push the latch keepers 58 outwardly through a holes 45 formed in the channels in the seat back 40 for engagement with the latch keepers 58.

Accordingly, the adjustment of the vertical position of the head rest 20 is accomplished by depressing the actuation button 52, which through engagement with the cam members 53 allows the latch keepers 58 to back out of the openings 45. Once the head rest 20 has been repositioned as desired, the actuation button 52 is released, causing the drivers 55 to rise back into engagement with the latch members 53 and drive the latch keepers 58 back out through a corresponding opening 45. In the event, the latch keeper 58 is not properly aligned with an opening 45, the spring-loaded cam members 53 will maintain a force on the drivers 55 until the head rest 20 is moved vertically until the latch keeper 58 aligns with an opening 45, whereupon the latch keeper 58 pops into the opening 45 as the driver 55 moves upwardly adjacent the latch keeper 58 to hold it in place.

The channels 42 are formed with a plurality of vertically spaced openings 45 to establish a corresponding number of predefined positions at which the head rest 20 can be located. In FIGS. 6 and 7, the head rest 20 is located at the highest available position, which corresponds to the position shown in FIGS. 1 and 2. In FIG. 8, the head rest 20 has been moved down two notches, as can be seen by the placement of the openings 45 shown in the drawing. In FIG. 9, the lowest available position for the head rest 20 is depicted, which corresponds to the position of the head rest shown in FIG. 3. The plurality of openings 45 formed in the back of the channel 42 can be seen in FIG. 9.

Referring now to FIGS. 12-16A, the pivotal movement of the side wings 24 can best be seen. The opposing side wings 24 are pivotally connected to the rear support portion 23 by the pivot mechanism 60, best seen in cross-section in FIGS. 15 and 16, and in the exploded view of FIG. 16A, having a lower portion 61 and an upper portion 62. The lower portion 61 is simply a hinge apparatus pivotally connecting a mounting member of the wing 24 to a corresponding mounting member on the rear support portion 23. The upper portion 62, however, includes a locking mechanism 65 that secures the side wing 24 in the desired angularly rotated position.

The locking mechanism 65 is operably disposed between the upper mounting member 63 on the rear support portion 23 and the lower mounting member 64 on the side wing 24 and includes an release button 66, a gear 67 interposed between the two mounting members 63, 64, and a spring 69 biasing the gear 68 into engagement with both the mounting members 63, 64. The release button 66 is captured by a housing built into the upper mounting member 63 by perpendicular feet formed at the end of the actuation legs 67 extending through openings in the upper mounting member to engage the gear 68, but is linearly movable within the housing.

The gear 68 is biased by the coil spring 69 underlying the gear 68 in an upward direction so as to be engagable with teeth formed on both the upper and lower mounting members 63, 64 simultaneously, as is best seen in FIG. 16. When the release button 66 is depressed into the housing the actuation legs 67 pass through openings in the housing to engage the gear 68 and cause the gear to depress against the biasing force exerted by the spring 69. When full depressed, the gear 68 only engages the lower mounting member 64 allowing the lower mounting member 64 and the side wing 24 attached thereto to rotate relative to the upper mounting member 63 and the rear support portion 23 of the head rest 20. The side wing 24 can be rotated to the desired position until the teeth of the upper and lower members 63, 64 align whereupon the spring 69 will urge the gear upwardly into engagement with the upper mounting member 64, as well as the lower mounting member 63, locking the side wing 24 into the desired pivoted location.

The head rest 20 may be packaged with the remainder of the car seat 10 disassembled from the seat back, thus requiring some assembly to complete the car seat 10. As is best seen in FIGS. 7 and 7A, the top of the channels 42 in the seat back 40 are widened rearwardly to accommodate the receipt of the support rails 22 of the head rest 20 with the latch keeper 58 protruding therefrom. The top of the seat back 40 has a retainer clip 25 mounted thereon to control the upward movement of the head rest 20 once assembled onto the seat back 40. The retainer clip 25 has a base member 26 affixed to the seat back 40 and a spring-loaded retainer catch 27 protruding therefrom over top of the widened portion of the channel 42. While a representative spring 28 is schematically shown as providing the biasing force for the retainer catch 27, the retainer catch 27 is preferably formed with curved fingers that compress and push against the base member 26 when the retainer catch 27 is retracted to provide a spring load on the retainer catch.

The retainer catch 27 is formed with a sloped upper surface 27a to define a cam surface that can be engaged by the support rail 22 and the protruding latch keeper 58 to force a retraction of the retainer catch 27 against the spring 28 into the base member 26, thus allowing the support rail 22 to enter into the channel 42 and the protruding latch keeper 58 to pass by the retainer clip 25, as is depicted in FIG. 7. Once the latch keeper 58 has passed the retainer clip 58, the retainer catch 27 springs back over the channel 42 against the latch members 57, which are detachably connected to the support rail 22 and define a ledge 22a over which the retainer catch 27 will lie to retain the support rail 22 within the channel 42, thus preventing the head rest 20 from being removed from the seat back.

In operation, the car seat 10 is preferably shipped to the consumer with the head rest 20 disassembled from the seat back 40. The head rest 20 can be mounted onto the seat back 40 by sliding the support rails 22 into the receiver channels 42 at the top portion of the seat back 40, forcing the retainer catch 27 into the base member 26 until the latch keeper 58 has passed the retainer clip 25. After the head rest 20 is assembled, the latching mechanism 50 will have to be retracted by depressing the actuator button 52 until the head rest 20 is positioned on the seat back 40 at the desired height relative to the seat assembly 30. The latching mechanism 50 extends the latch keeper 58 into an opening 45 in the back of the channel 42 to secure the head rest 20 in the desired vertical position.

Once properly secured to the automobile seat, the car seat 10 is ready for use. As the child grows in size, the car seat 10 can be reconfigured to accommodate the growth. The head rest 20 can be repositioned vertically to match the size of the child. Eventually, the child will grow to the stage where the harness is not necessary, as the automotive seat belts can provide a secure environment for the transportation of the child, though the child is not yet large enough for the automotive seat belts to fit the child properly. In this situation, the seat back 40 can be moved to the highest allowable position, as depicted in FIGS. 1 and 2, and the car seat 10 used as a high back booster seat. The shoulder strap part of the automotive seat belt (not shown) can be passed through the should belt guide member 19 attached to the head rest 20 through the slot formed therein to position the shoulder strap appropriately according to the location of the head rest 20, which in turn should correspond to the height of the child using the seat.

Figure 17:
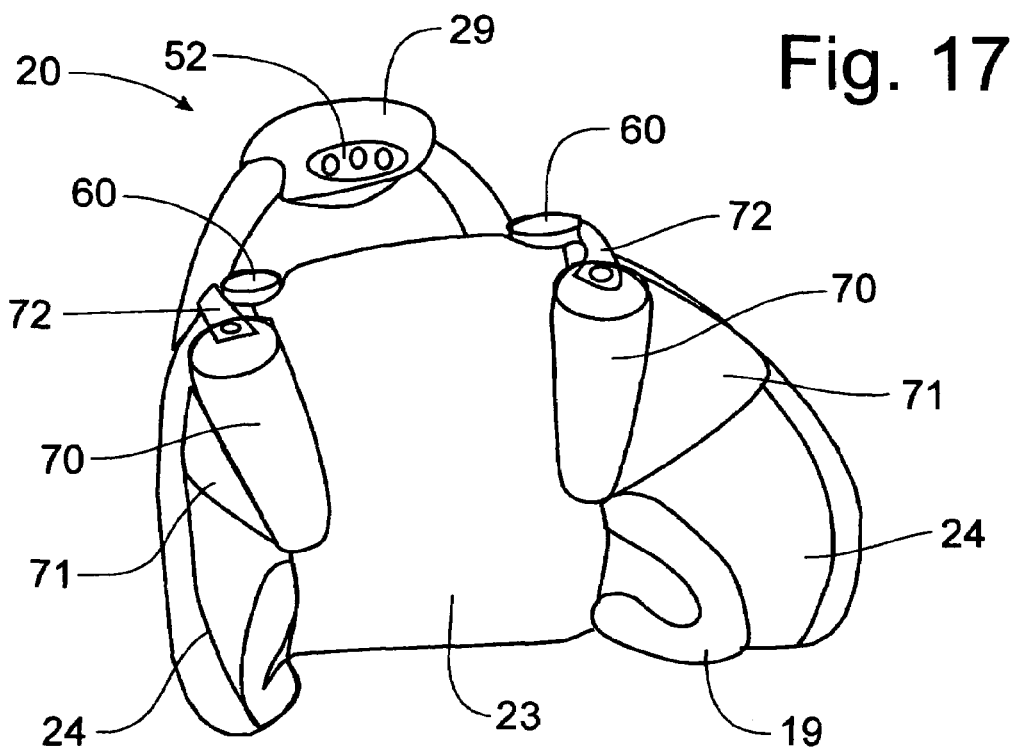
FIG. 17 is a schematic front perspective view of the head rest having optional pillow supports mounted thereon, the pillow supports being depicted in the raised position.
Figure 18:
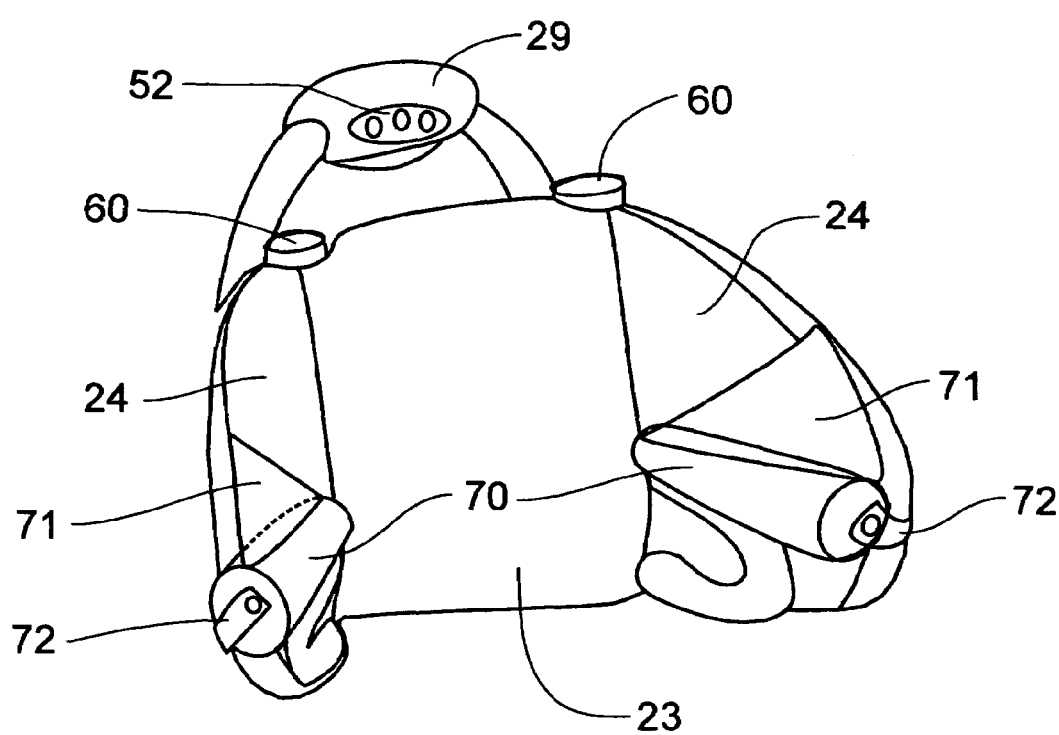
FIG. 18 is a schematic front perspective view of the head rest similar to that of FIG. 17, but showing the pillow supports being placed in a lowered position.

Referring now to FIGS. 17 and 18, an optional pillow 70 can be mounted to the head rest 20 to aid in the comfort of the child being transported in the car seat 10. Preferably, the pillow 70 is generally cylindrically shaped to best conform to the shape of the side wings 24. The pillow 70 is supported in an attachment member 71 that is connected to the corresponding side wing 24 along an angularly disposed axis. The outboard end of the pillow 70 includes a connector 72 that is attached to the pillow 70 and extendable therefrom to be engagable with the side wing 24 on which the pillow 70 is mounted. The angular mounting axis of the attachment member 71 allows the pillow 70 to be oriented between a generally vertical position, as is depicted in FIG. 17 and a generally horizontal position, as is depicted in FIG. 18. Once positioned as desired, the connector 72 can be attached to the side wing 24 to secure the outboard end of the pillow from movement.

The connector 72 can be of any conventional device, such as hook and loop fasteners or snaps, so long as the connector can be repositioned as needed. The placement of the pillow 70 in the generally vertical position allows the head of the child in the car seat 10 to be framed by the pillows 70. When in the horizontal position, the child can use the pillow to rest his head and keep the head from bobbing around with the motion of the automobile. Preferably the attachment member 71 is constructed of a fabric material which can be sewed to the covering on the head rest 10, or detachably connected by such convention devices as hook and loop fasteners or snaps.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A head rest for a car seat utilized for transporting a child in an automobile, said head rest being mountable on a seat back, comprising:
    a frame including a support rail engagable with a corresponding hollow channel in said seat back to permit said frame to move vertically relative to said seat back;
    a rear support portion mounted on said frame;
    a pair of laterally spaced side wings pivotally connected to said rear support portion by a pivot mechanism so that said side wings are independently angularly positionable relative to said rear support portion irrespective of the vertical position of said frame relative to said seat back; and
    a latching mechanism operable to engage said channel to secure said frame in a selected vertical position.

2. The head rest of claim 1 wherein said pivot mechanism includes a locking apparatus operable to lock said side wings in a desired angular position.

3. The head rest of claim 2 wherein said pivot mechanism comprises:
    a first mounting member connected to said rear support portion;
    a second mounting member connected to the corresponding said side wing and being rotatably connected to said first mounting member;
    said locking apparatus being positioned between said first and second mounting members to control the rotational movement of said second mounting member relative to said first mounting member; and
    an actuator operably connected to said locking apparatus for selectively allowing a release of said locking apparatus from said first mounting member.

4. The head rest of claim 3 wherein said locking apparatus comprises:
    a gear mounted for rotation with said second mounting member; and
    a spring biasing said gear into engagement with both said first and second mounting members, said actuator being operable to move said gear axially against said biasing force out of engagement with said first mounting member, thus allowing said second mounting member to rotate relative to said first mounting member.

5. The head rest of claim 1 wherein said channel is provided with a retaining clip to retain said support rail within said channel and prevent said head rest from being removed from said seat back.

6. The head rest of claim 5 wherein said retainer clip comprises:
    a base member affixed to said seat back;
    a retainer catch slidably mounted within said base member; and
    a spring to bias said retainer catch outwardly from said base member.

7. The head rest of claim 6 wherein said latching mechanism is detachably connected to said support rail and includes a latch keeper that projects outwardly therefrom into engagement with a corresponding opening in said channel to secure said head rest in a selected vertical position, said retainer catch having a sloped upper surface to allow said latch keeper to cam said retainer catch into said base member against said biasing force.

8. The head rest of claim 7 wherein an upper portion of said channel is widened to accommodate the receipt of the corresponding said support rail with said latch keeper protruding therefrom until positioned below said retainer clip.

9. The head rest of claim 8 wherein said latching member defines a ledge against which said retainer catch interferes to prevent said support rail from disengaging the corresponding said channel.

10. The head rest of claim 1 wherein said latching mechanism comprises:
    an actuator supported on said frame for movement between a home position and a release position;

a cam member engaged with said actuator and being spring-loaded toward said home position;
a drive member located in said support rail;
a flexible link interconnecting said cam member and said drive member;
a latch member positioned for engagement with said drive member and being engagable with said channel when forced outwardly from said support rail into engagement with said channel.

11. The head rest of claim 10 wherein said latch member is a resilient member oriented to be housed within said support rail until driven outwardly into engagement with said channel, said latch member including a latch keeper that engages said channel.

12. The head rest of claim 11 wherein said drive member drops below said latch member when said actuator is moved into said release position moving said cam members and said drive members through said flexible links, whereby said latch member is free to retract into said support rail to disengage said latch keeper from said channel.

13. A car seat for transporting a child in an automobile, comprising:
    a seat member;
    a seat back connected to said seat member, said seat back including at least one hollow channel;
    a head rest including at least one support rail in register with the corresponding said hollow channel to be received therein when said head rest is mounted on said seat back such that said head rest is vertically positionable relative to said seat back;
    a retainer clip mounted on said seat back and being operable to prevent said at least one support rail from disengaging the corresponding said hollow channel, said retainer clip including a base member affixed to said seat back, a retainer catch slidably mounted within said base member, and a spring to bias said retainer catch outwardly from said base member; and
    a latching mechanism including a latch keeper that projects outwardly from said at least one support rail into engagement with a corresponding opening in the corresponding said channel to secure said head rest in a selected vertical position, said retainer catch having a sloped upper surface to allow said latch keeper to cam said retainer catch into said base member against said biasing force.

14. The car seat of claim 13 wherein an upper portion of said at least one channel is widened to accommodate the receipt of the corresponding said support rail with said latch keeper protruding therefrom until positioned below said retainer clip, said retainer catch interfering with a ledge operably associated with said support rail to prevent said support rail from disengaging the corresponding said channel.

15. The car seat of claim 14 wherein said head rest includes a rear support portion and a pair of laterally spaced side wings pivotally connected to said support portion by respective pivot mechanisms to permit an angular positioning of each said side wing relative to said rear support portion.

16. The car seat of claim 15 wherein each said pivot mechanism comprises:
    a first mounting member connected to said rear support portion;
    a second mounting member connected to the corresponding said side wing and being rotatably connected to said first mounting member;
    a locking apparatus positioned between said first and second mounting members to control the rotational movement of said second mounting member relative to said first mounting member; and
    an actuator operably connected to said locking apparatus for selectively allowing a release of said locking apparatus from said first mounting member.

17. The car seat of claim 16 wherein said locking apparatus comprises:
    a gear mounted for rotation with said second mounting member; and
    a spring biasing said gear into engagement with both said first and second mounting members, said actuator being operable to move said gear axially against said biasing force out of engagement with said first mounting member, thus allowing said second mounting member to rotate relative to said first mounting member.

18. In a car seat for use in an automobile to transport a child, said car seat having a seat member, a seat back extending generally vertically from said seat member, and a head rest mounted on said seat back, said head rest having a rear support portion and a pair of laterally spaced side wings extending outwardly therefrom, the improvement comprising:
    a pillow assembly affixed to each said side wing, said pillow being mounted on an attachment member connected to said side wing to allow said pillow to move between a generally vertical position and a generally horizontal position on said side wing.

19. The car seat of claim 18 wherein said pillow further includes a connector affixed to a distal end of said pillow to connect with the corresponding said side wing to secure said distal end of said pillow in the desired position.

20. The car seat of claim 19 wherein said attachment member is connected to the side wing along an angularly disposed axis that places an inboard end of said pillow at a position against said seat back, said distal end being movable about said inboard end in moving between said generally vertical position and said generally horizontal position.

21. The car seat of claim 20 wherein said attachment member is constructed of fabric and is sewn to said side wing.

* * * * *